(12) United States Patent
Kojima et al.

(10) Patent No.: US 9,325,215 B2
(45) Date of Patent: Apr. 26, 2016

(54) INNER-ROTOR-TYPE MOTOR

(71) Applicant: NIDEC SERVO CORPORATION, Kiryu-shi, Gumma (JP)

(72) Inventors: Akinori Kojima, Kiryu (JP); Noriyoshi Kikuchi, Kiryu (JP); Eiji Kaneko, Kiryu (JP)

(73) Assignee: NIDEC SERVO CORPORATION, Gumma (JP)

( * ) Notice: Subject to any disclaimer, the term of this patent is extended or adjusted under 35 U.S.C. 154(b) by 0 days.

(21) Appl. No.: 14/352,036

(22) PCT Filed: Dec. 19, 2012

(86) PCT No.: PCT/JP2012/082980
§ 371 (c)(1),
(2) Date: Apr. 15, 2014

(87) PCT Pub. No.: WO2013/094659
PCT Pub. Date: Jun. 27, 2013

(65) Prior Publication Data
US 2015/0108876 A1    Apr. 23, 2015

(30) Foreign Application Priority Data
Dec. 22, 2011  (JP) .................................. 2011-280657

(51) Int. Cl.
*H02K 5/00* (2006.01)
*H02K 5/15* (2006.01)
(Continued)

(52) U.S. Cl.
CPC .................. *H02K 5/15* (2013.01); *H02K 3/522* (2013.01); *H02K 5/10* (2013.01); *H02K 5/161* (2013.01); *H02K 37/14* (2013.01)

(58) Field of Classification Search
CPC ............ H02K 5/161; H02K 5/14; H02K 5/15
USPC ..................... 310/49.01–49.55, 215
See application file for complete search history.

(56) References Cited

U.S. PATENT DOCUMENTS

2004/0256936 A1   12/2004   Takahashi et al.
2007/0120426 A1*   5/2007   Oiwa et al. ................. 310/49 R
(Continued)

FOREIGN PATENT DOCUMENTS

JP    10-304644 A     11/1998
JP    2001-145325 A   5/2001
(Continued)

OTHER PUBLICATIONS

Machine translation for JP 2003-111337 Sep. 15, 2015.*
(Continued)

*Primary Examiner* — Hanh Nguyen
(74) *Attorney, Agent, or Firm* — Keating & Bennett, LLP

(57) ABSTRACT

An inner-rotor-type motor includes four outer surface portions flush or substantially flush with the motor outer surface of the core-back portion provided in the frame portion of each of the two insulating members of the insulator to secure electrical insulation between the stator core and the coil. The outer surface portions of the frame portion of each of the insulating members are inserted between the leg portions of four corners of each of the cover members attached to the axial opposite sides of the stator core. In this state, the cover members are attached to the stator core. The inner-rotor-type motor makes it possible to easily and cost-effectively manufacture a cover member without impairing the dust-proofness of the interior of the motor and greatly improves ease of assembly.

10 Claims, 10 Drawing Sheets

(51) Int. Cl.
*H02K 37/14* (2006.01)
*H02K 5/10* (2006.01)
*H02K 3/52* (2006.01)
*H02K 5/16* (2006.01)

(56) References Cited

U.S. PATENT DOCUMENTS

2009/0324435 A1* 12/2009 Sears et al. .................. 417/423.7
2011/0101814 A1* 5/2011 Finkle et al. .............. 310/156.83
2013/0154405 A1* 6/2013 Trung et al. ................ 310/49.37

FOREIGN PATENT DOCUMENTS

| | | |
|---|---|---|
| JP | 2003-111337 A | 4/2003 |
| JP | 2007-089304 A | 4/2007 |
| WO | 2011/019508 A1 | 2/2011 |

OTHER PUBLICATIONS

Official Communication issued in International Patent Application No. PCT/JP2012/082980, mailed on Mar. 26, 2013.

* cited by examiner

INNER-ROTOR-TYPE MOTOR

BACKGROUND OF THE INVENTION

1. Field of the Invention

The present invention relates to an inner-rotor-type motor, such as, for example, a stepping motor or the like, which includes a stator provided by winding a coil around a plurality of main poles as winding poles and a rotor arranged inside the stator.

2. Description of the Related Art

Conventionally, a stepping motor is used in a drive portion in a wide variety of fields including an information device field such as a printer, a facsimile machine, a copier or the like and an industrial device field such as a factory automation device or the like. In case where the stepping motor of this kind is, e.g., a hybrid type that makes use of a magnetic body and a permanent magnet as a rotor, there have been widely used inner-rotor-type motors disclosed in Japanese Patent Application Publication Nos. 2002-051528 and 2001-112521.

More specifically, a stator core is formed by installing a plurality of main poles in a core-back portion as a ring-shaped magnetic frame so as to protrude radially inward. A stator is formed by winding a coil around the respective main poles of the stator core through insulating members. A hybrid type rotor formed by interposing an axially-magnetized permanent magnet between a pair of magnetic bodies is arranged inside the stator with an air gap therebetween. Cover members are arranged at the axial opposite sides of the stator. A rotor shaft of the rotor is supported by bearings retained in the central portions of the cover members.

In the inner-rotor-type stepping motor of this configuration, the outer peripheral surface of the stator core, i.e., the outer peripheral surface of the core-back portion, forms a portion of an outer surface of the motor. It is therefore possible to effectively dissipate the heat generated within the motor through the stator core. Moreover, there is no need to cover the outer peripheral surface of the stator core with a motor cover. This provides an advantage in that it is possible to reduce the cost of materials such as a motor cover and the like. The cover members arranged at the axial opposite sides of the stator core are configured to wholly cover the coil and the insulating members protruding beyond the axial end surfaces of the stator core. For that reason, a dust-free interior of the motor is secured.

In the inner-rotor-type stepping motor mentioned above, when connecting the coil to an external device, as disclosed in, e.g., Japanese Patent Application Publication No. 2002-051528, an end portion of a coil and a drawing-out lead wire are connected to each other in a relay substrate arranged within a cover member. The lead wire is drawn out through an drawing-out hole formed in the cover member. Alternatively, as disclosed in, e.g., Japanese Patent Application Publication No. 2001-112521, an end portion of a coil is connected to a relay substrate arranged within a cover member. A connector is mounted to the relay substrate so that the connector can be electrically connected to the coil. The connector is led out through a portion of the cover member so that the connector can be connected to an external connector.

In the conventional configuration mentioned above, however, the drawing-out hole of the lead wire needs to be formed in the cover member in order to connect the coil to an external device. With a view to lead out the connector, the cover member needs to be subjected to special processing. This leads to an increase in the component processing cost. Moreover, the cover member needs to be fixed to the stator in an accurate fixing direction. This poses a problem in that the assembly becomes difficult.

While the foregoing description has been made by taking an instance where the motor employs a hybrid type rotor, the aforementioned problems are also posed in an inner-rotor-type motor that employs, as its rotor, a permanent magnet type rotor in which different magnetic poles are alternately arranged along a circumferential direction.

SUMMARY OF THE INVENTION

Preferred embodiments of the present invention provide an inner-rotor-type motor which makes it possible to easily and cost-effectively manufacture a cover member without impairing the dust-free interior of the motor and which enjoys a greatly improved ease of assembly.

In accordance with a preferred embodiment of the present invention, an inner-rotor-type motor includes a stator including a stator core and a coil, the stator core including a ring-shaped core-back portion and a plurality of main poles protruding radially inward from the core-back portion, the coil wound around each of the main poles through an insulator; a rotor rotatably arranged inside the stator to face tip ends of the main poles and provided with a rotor shaft extending along a center axis; and cover members arranged to cover axial opposite sides of the stator and configured to hold bearings which support the rotor shaft, wherein the core-back portion of the stator core has a square or substantially square shape, the core-back portion includes side surfaces corresponding to four sides of a square, the side surfaces of the core-back portion define motor outer surfaces; the insulator includes two insulating members mounted to the stator core at the axial opposite sides thereof, each of the insulating members includes a plurality of slot insulating portions which covers the main poles and an octagonal or substantially octagonal frame portion which interconnects the slot insulating portions at an axial end surface side of the stator core, the frame portion includes four outer surface portions flush or substantially flush with the motor outer surfaces of four sides of the core-back portion; each of the cover members includes an end plate portion defining an end surface of the motor and provided with a bearing holding portion in a central region thereof and four leg portions arranged in four corners of the end plate portion and configured to make contact with axial end surfaces of four corner portions of the stator core; and each of the outer surface portions of the frame portion of each of the insulating members inserted between the leg portions of each of the cover members.

A radial minimum thickness of the four sides of the core-back portion may be set to a minimum value within a range permitted as a magnetic path in terms of a magnetic property, and a protruding length of each of the main poles may be set to a minimum value which allows the coil to be wound around each of the main poles at a predetermined winding number. The ratio of an inner diameter of the stator core to a minimum outer diameter of the stator core may preferably be set to about 0.7, for example.

A tip end of the frame portion of each of the insulating members may be configured to closely contact the end plate portion at least in the four outer surface portions. The frame portion of each of the insulating members may include a base-side ring-shaped frame having a smaller diameter, a tip-end-side ring-shaped frame having a larger diameter, and a ring-shaped thin portion which interconnects the base-side ring-shaped frame and the tip-end-side ring-shaped frame, the tip-end-side ring-shaped frame corresponding to the four outer surface portions being flush or substantially flush with the motor outer surface of the core-back portion.

Claws locked to the outer surfaces of the four corner portions of the stator core at the outer side thereof may be defined by a single monolithic member together with the leg portions of each of the cover members. Fixing holes may be provided in the four corner portions of the stator core and in the leg portions of each of the cover members, and each of the cover members is fastened to the stator core by screws inserted through the fixing holes of the stator core. Each of the cover members may preferably have a 90° rotation symmetry shape.

The sections of the frame portion of each of the insulating members interposed between the four outer surface portions may be arranged along the inner sides of the leg portions of each of the cover members. A drawing-out hole of a lead wire connected to the coil or a connector mounting portion may be provided on an outer surface portion of one of the insulating members.

In the inner-rotor-type motor configured as described above, four outer surface portions flush or substantially flush with the motor outer surface of the core-back portion are defined in the frame portion of each of the two insulating members of the insulator to secure insulation between the stator core and the coil. The outer surface portions of the frame portion of each of the insulating members are inserted between the leg portions of four corners of each of the cover members attached to the axial opposite sides of the stator core. In this state, the cover members are attached to the stator core. Therefore, each of the cover members is simple in configuration by provided the end plate portion and the leg portions arranged at the four corners. It is also possible to save the material costs and to form each of the cover members into a 90° rotation symmetry shape. Thus, the installation position of each of the cover members with respect to the stator has no directivity. Each of the cover members can be attached to the stator in any of the positions spaced apart 90° from each other. That is to say, there is no restriction in the fixing position of each of the cover members. This provides an advantage in that the ease of assembly is significantly improved.

In addition, each of the cover members has a simple shape in which the leg portions are merely arranged in the four corners. The frame portion of each of the insulating members is partially inserted between the leg portions to define the motor outer surface. Therefore, a dust-free interior of the motor is reliably secured. Moreover, the outer surface portions, i.e., some portions, of each of the insulating members are exposed to the outside. As a result, it is possible significantly enhance the design as compared with the conventional motor in which only the cover members are exposed to the outside.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of an inner-rotor-type motor according to the present invention will now be described with reference to the drawings.

First Preferred Embodiment

Figure 1:
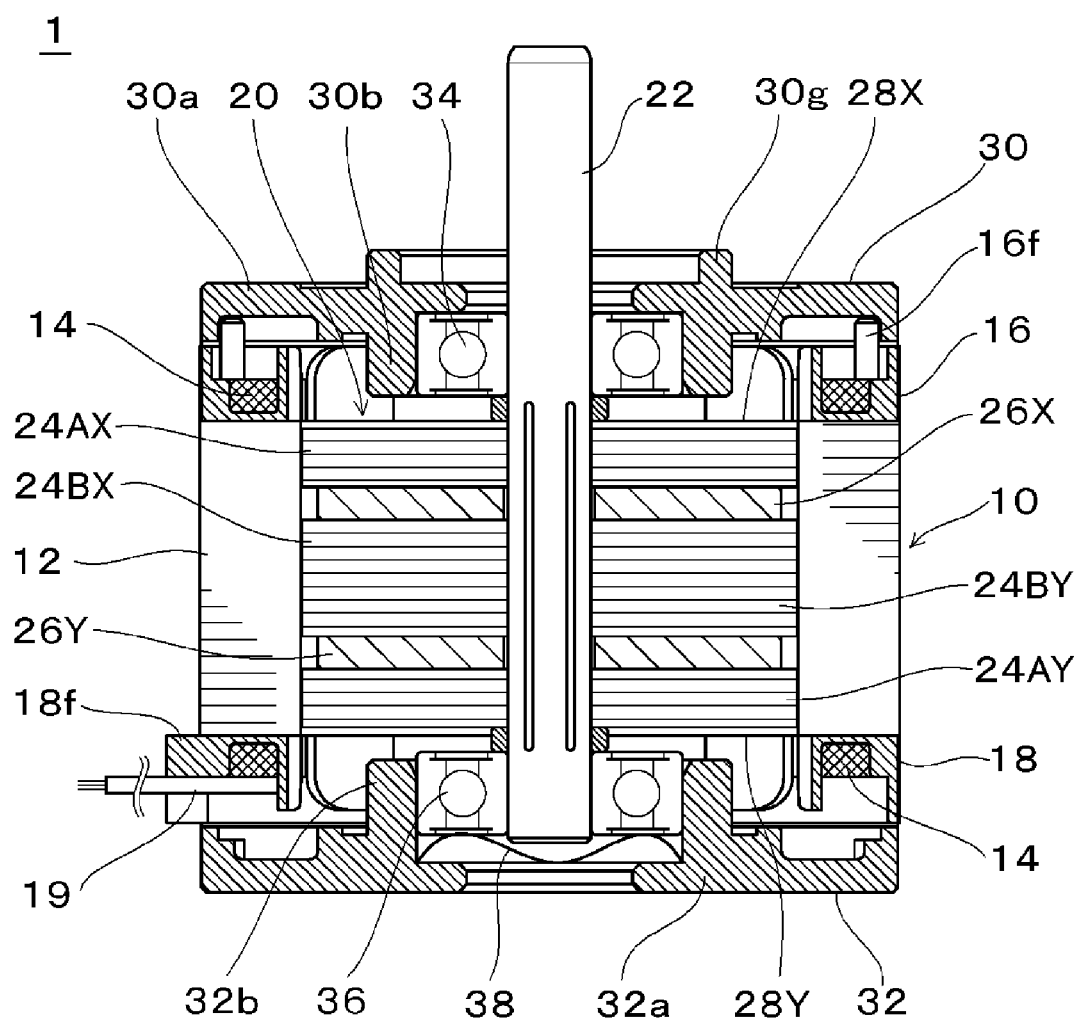
FIG. 1 is a sectional front view showing an inner-rotor-type stepping motor according to a preferred embodiment of the present invention.
Figure 2:
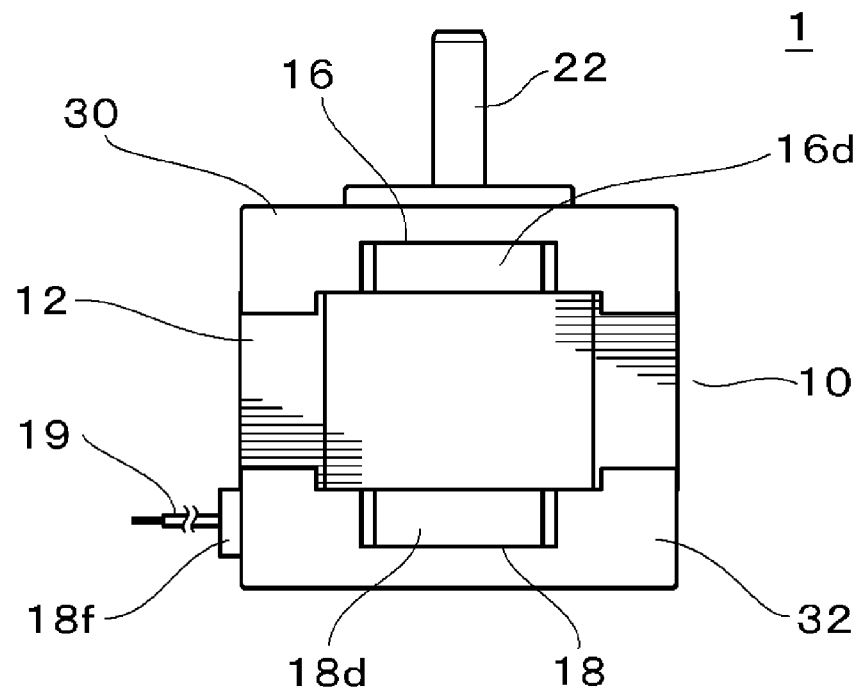
FIG. 2 is a front view of the stepping motor shown in FIG. 1.
Figure 3:
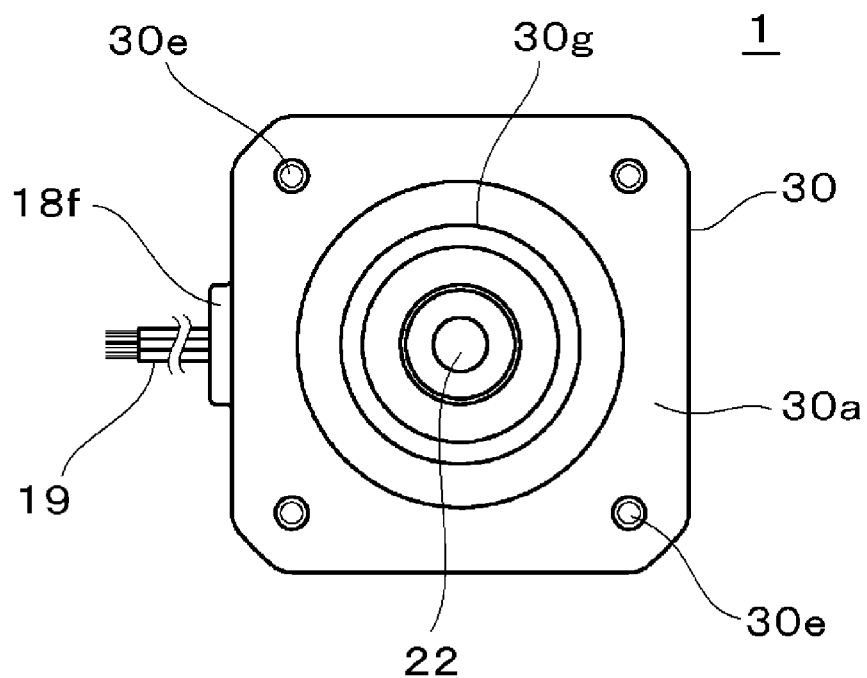
FIG. 3 is a top view of the stepping motor shown in FIG. 1.
Figure 4:
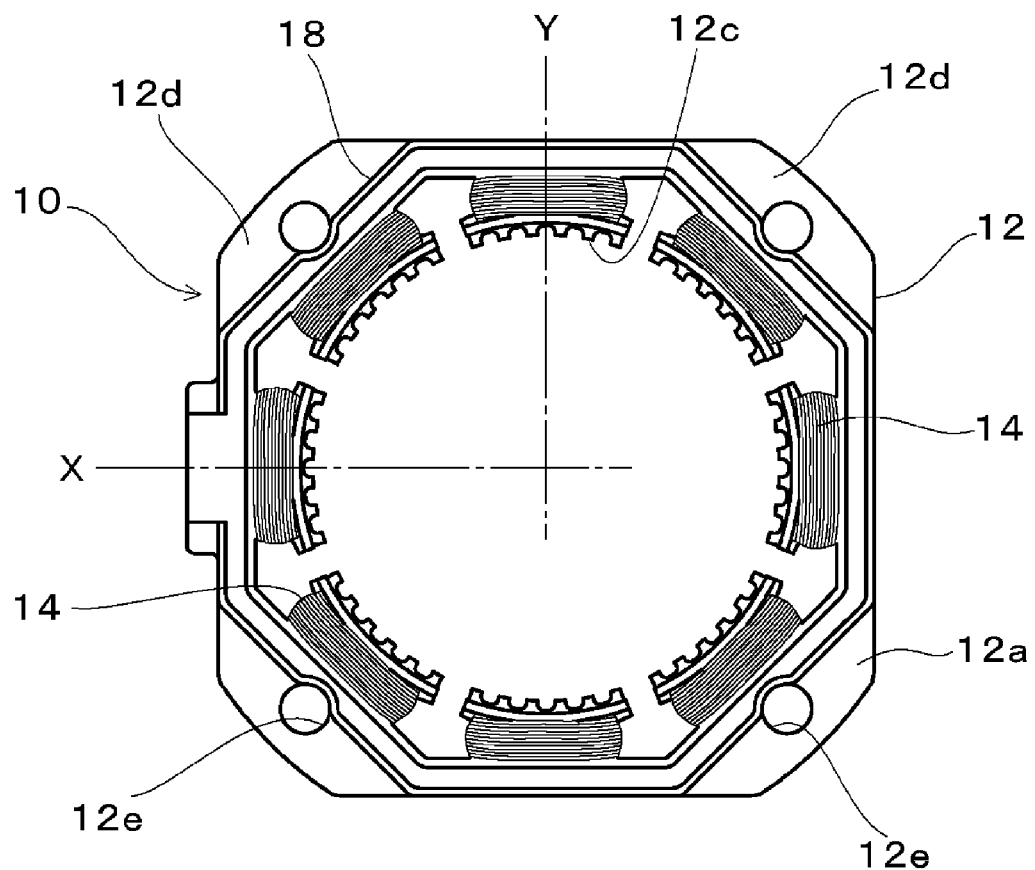
FIG. 4 is a bottom view showing a stator of the stepping motor shown in FIG. 1.
Figure 5:
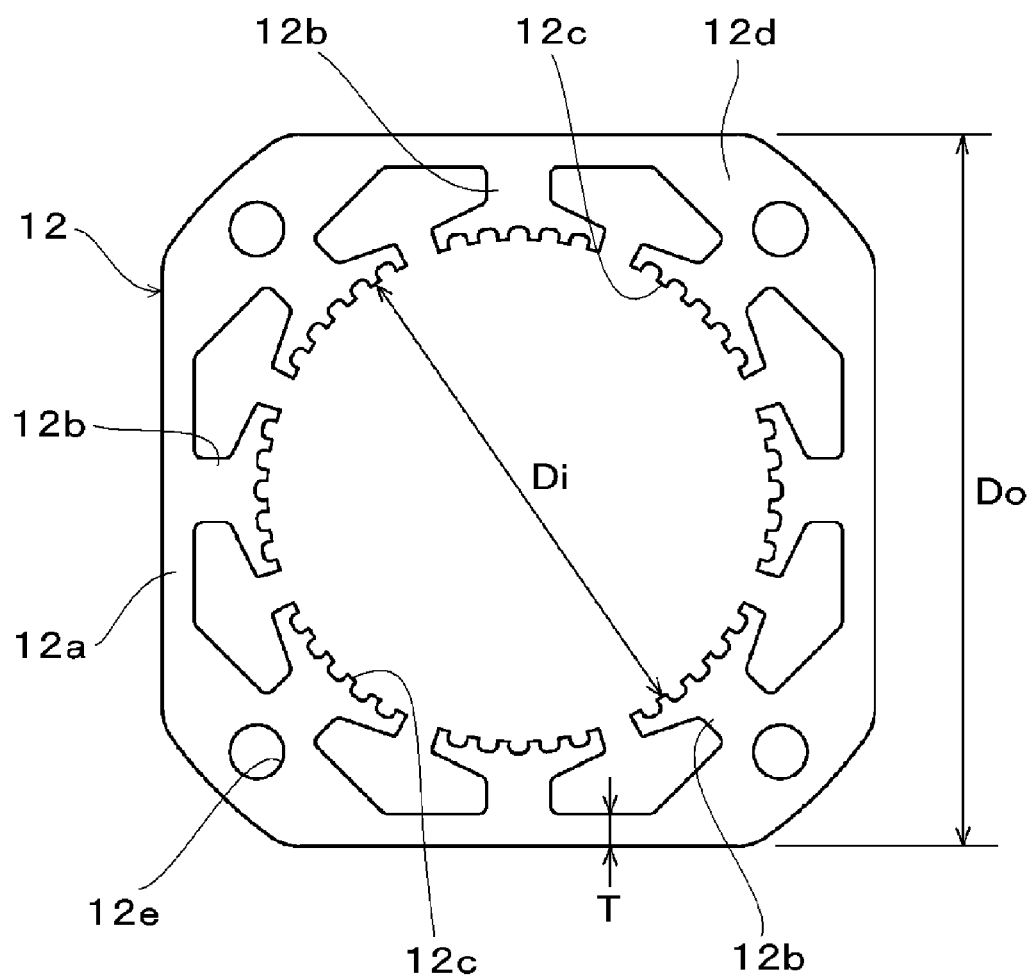
FIG. 5 is a top view showing a stator core of the stepping motor shown in FIG. 1.

FIGS. 1 to 3 shows an overall configuration of a two-phase hybrid (HB) type stepping motor 1 according to a preferred embodiment of the present invention. FIG. 1 is a sectional front view of the stepping motor 1, FIG. 2 is a front view thereof, and FIG. 3 is a top view thereof. FIG. 4 shows a stator 10 including a two-phase eight-main-pole structure which does not generate an unbalanced electromagnetic force and which is superior in high-speed performance. FIG. 5 shows a stator core 12.

The stator 10 preferably includes a stator core 12 including a ring-shaped core-back portion 12a having a square or substantially square contour and eight main poles 12b protruding radially inward from the core-back portion 12a and arranged at a regular interval along the circumferential direction, a two-phase coil 14 (see FIGS. 1 and 4) wound around the respective main poles 12b, and upper and lower insulating members 16 and 18 interposed between the respective main poles 12b and the coil 14. For example, six inductor teeth 12c preferably protrude from the tip end of each of the main poles 12b as winding poles. The six inductor teeth 12c are preferably arranged at a regular interval in each of the main poles 12b and are arranged in symmetrical positions with respect to a centerline of each of the main poles 12b.

The stator core 12 is preferably defined by stacking a plurality of silicon steel plates one above another. As shown in FIG. 4, first-phase main poles (A-phase or C-phase main poles) are provided by four main poles 12b arranged on two X-axis and Y-axis lines orthogonal to each other, namely four main poles 12b arranged at an interval of 90°. Second-phase main poles (B-phase or D-phase main poles) are preferably defined by four remaining main poles 12b arranged at a mechanical angle interval of 90° from each other and at a mechanical angle interval of 45° from the first-phase main poles. When an electric current is supplied through the coil 14, the four main poles 12b of each phase arranged at the interval of 90° are excited and driven so that they alternatingly become different polarity poles.

Figure 14:
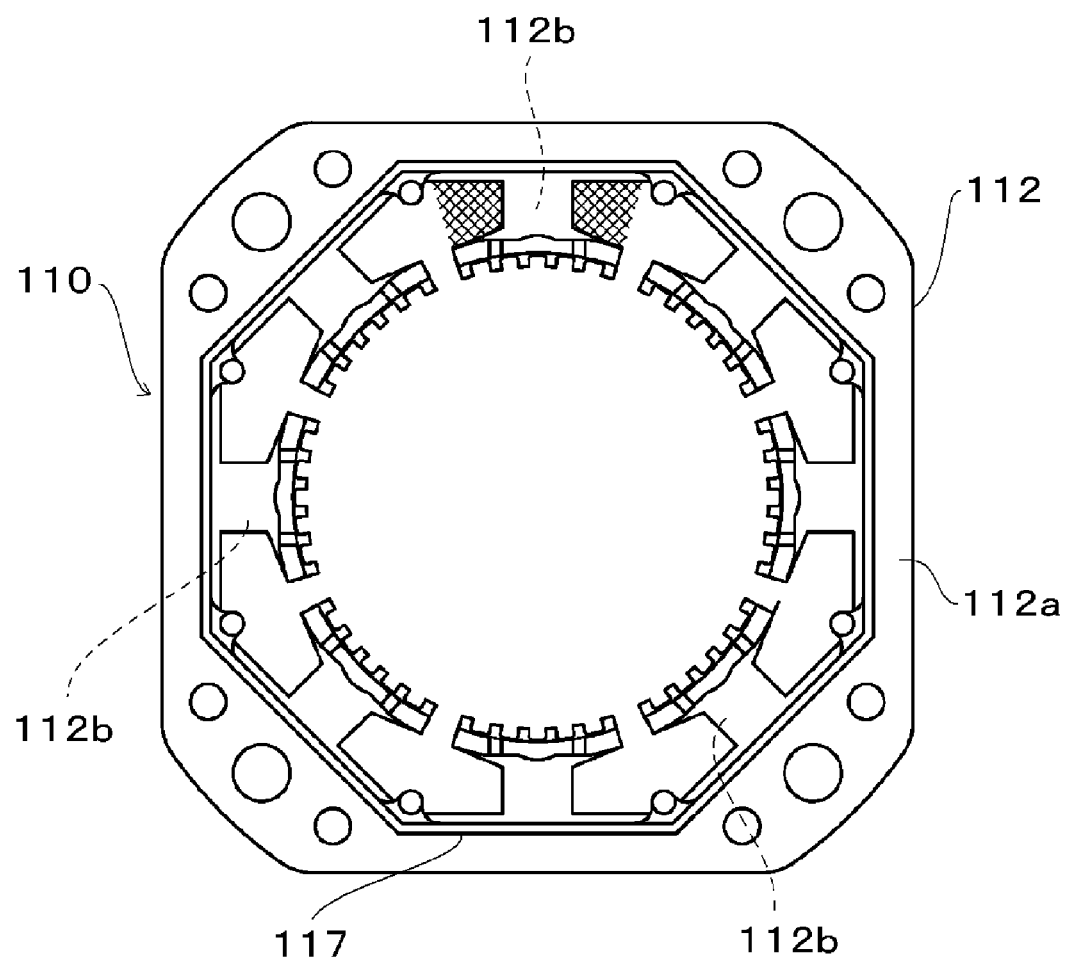
FIG. 14 is a top view showing a portion of a stator unit of a conventional inner-rotor-type stepping motor.

As shown in FIG. 5, in the stator core 12, the radial thickness T of each of four sides of the core-back portion 12a is preferably set to be equal or substantially equal to a minimum value within a range permitted as a magnetic path in terms of a magnetic property. In addition, the winding number of the coil 14 to each of the main poles 12b is preferably set to that in the conventional case. As a result, the inner diameter of the stator core 12 is maximized. FIG. 14 shows a portion of a stator 110 of a conventional stepping motor. In a core-back portion 112a having a substantially square contour with four corners chamfered, a plurality of main poles 112b protruding radially inward is arranged at a regular interval along the circumferential direction. A coil (not shown) is wound around the respective main poles 112b through an insulator 117. In this case, the radial thickness of the core-back portion 112a preferably is relatively large so that the whole circumference of a frame portion of the insulator 117 can be covered with cover members arranged at the axial opposite sides of a stator core 112. Net lines shown in FIG. 14 indicate a region where a coil can be wound around each of the main poles 112b. If the protruding length of the main poles 12b shown in FIG. 5 is set to secure, to the utmost limit, the coil amount equal to the amount of coil which can be wound in the region, it becomes possible to maximize the inner diameter of the stator core 12 by setting the radial thickness of the core-back portion 12a to a minimum value.

For example, Japanese Patent Application Publication No. H5-168214 recites that, in order for a rotor to generate a maximum torque, the ratio of an inner diameter of a stator to an outer diameter thereof is set equal to 0.62 to 0.64 in case of two phases. In contrast, as a result of verification conducted through tests and analyses of a case where the core-back portion 12a has a square or substantially square shape in accordance with the present preferred embodiment, it has been confirmed that, in terms of properties, the ratio of the inner diameter Di to the minimum outer diameter Do of the stator core 12 corresponding to the length of one side of a square can preferably be set to about 0.71 at most. Thus, it is possible to set the inner diameter Di to be about 15% larger than is possible in the conventional art.

The four corners of the stator core 12 preferably have a relatively large radial thickness and become receiving portions 12d to which the cover members are fastened. Screw insertion holes 12e are preferably provided in the receiving portions 12d. The outer peripheral surfaces of the four corners of the stator core 12 are chamfered to be rounded.

In the present preferred embodiment, the stator core 12 is preferably defined by stacking a predetermined number of silicon steel plates one above another. By using a method in which silicon steel plates are punched into a specified shape and are stacked one above another by sequentially rotating them at 90°, it is possible to obtain significantly reduce or prevent variation of permeance vectors. That is to say, since the stator core 12 shown in FIG. 5 has a 90° point-symmetric structure, by stacking the silicon steel plates one above another while sequentially rotating them by 90°, it is possible to cancel the variation of permeance vectors otherwise caused by the minute difference in the dimension of a press mold or the difference in the thickness of the silicon steel plates.

Figure 6A:
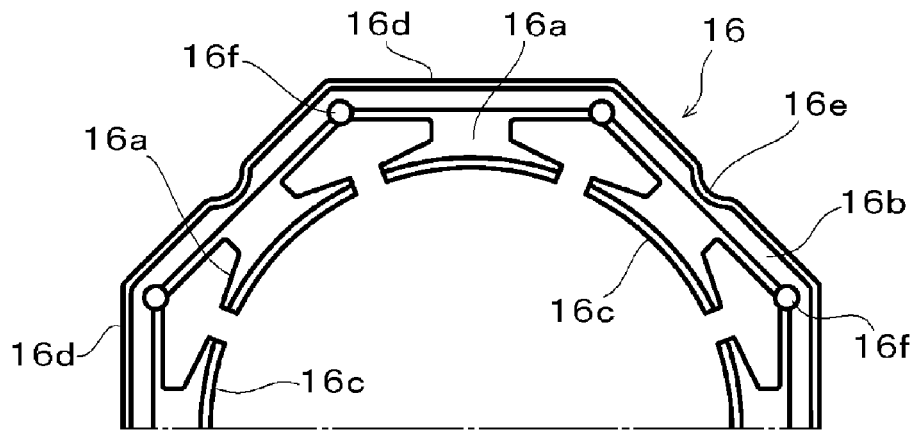
FIG. 6A is a top view showing a portion (one half) of an upper insulating member of the stepping motor shown in FIG. 1.
Figure 6B:
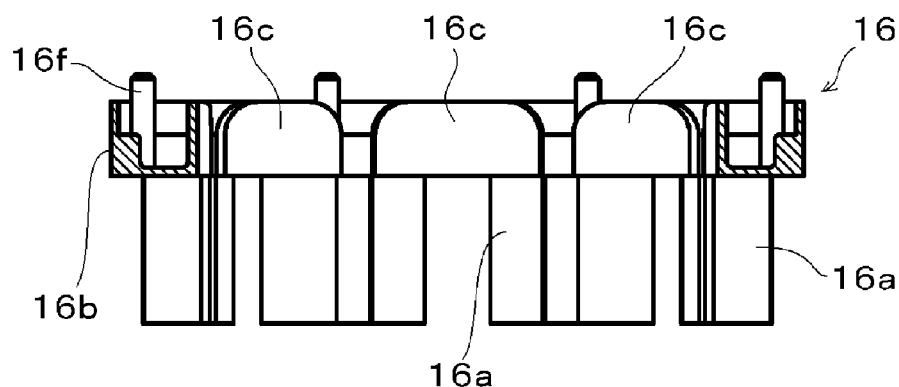
FIG. 6B is a sectional front view thereof.
Figure 6C:
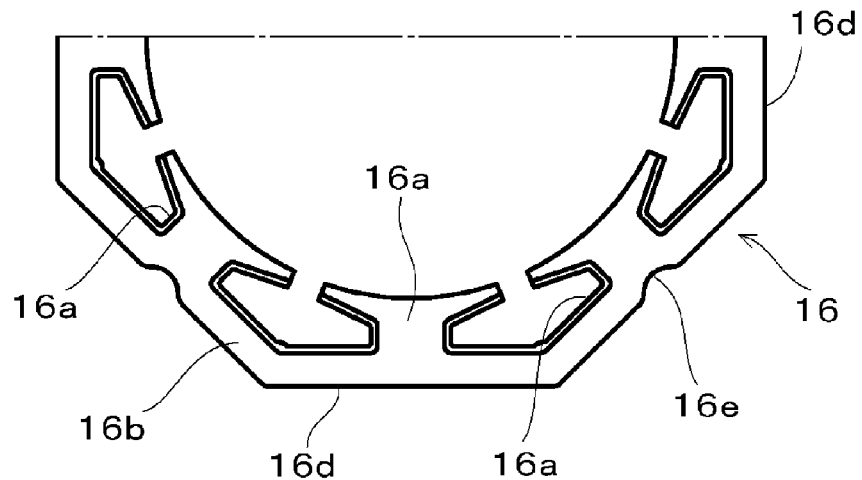
FIG. 6C is a bottom view thereof.

A pair of insulating members 16 and 18 is preferably mounted to the stator core 12 at the axial opposite sides thereof (hereinafter referred to as upper and lower sides for the sake of convenience). The insulating members 16 and 18 define and serve as an insulator configured to electrically insulate the coil 14 with respect to the stator core 12. The upper insulating member 16 mounted at the upper side is preferably configured as shown in FIGS. 6A to 6C. The upper insulating member 16 includes slot insulating portions 16a covering the upper surfaces and the side surfaces of the respective main poles 12b and a ring-shaped frame portion 16b interconnecting the upper sections of the respective slot insulating portions 16a. The radial outer periphery of each of the slot insulating portions 16a is arranged to extend along the inner peripheral surface of the core-back portion 12a. The adjoining slot insulating portions 16a are connected to each other. Thus, the slot insulating portions 16a are configured to cover the inner surfaces of individual slots. In the inner peripheries of the upper surfaces of the slot insulating portions 16a, tongue pieces 16c are preferably arranged in a corresponding relationship with the tip end portions of the respective main poles 12b to protrude upward. The tongue pieces 16c prevent the coil 14 from jutting inward.

The frame portion 16b preferably is configured to have a regular octagonal contour or a substantially regular octagonal contour. The base section (lower half section) of the frame portion 16b used in interconnecting the respective slot insulating portions 16a is preferably thick. The tip end section (upper half section) of the frame portion 16b with which one of the below-mention cover members makes contact is preferably thin. In the frame portion 16b having a regular octagonal shape, the outer peripheral surfaces of the portions corresponding to four sides of the stator core 12 are outer peripheral surface portions 16d flush or substantially flush with the outer peripheral surface of the core-back portion 12a. The outer peripheral surface portions 16d define a portion of the outer surface of the motor. The portions positioned between the respective outer peripheral surface portions 16d of the frame portion 16b are arranged along the inner sides of the receiving portions 12d of the stator core 12 and are provided with recess portions 16e positioned in alignment with the positions of the screw insertion holes 12e. Pins 16f that retain the crossover wires of the coil protrude in alignment with the central positions of the respective slot.

Figure 7A:
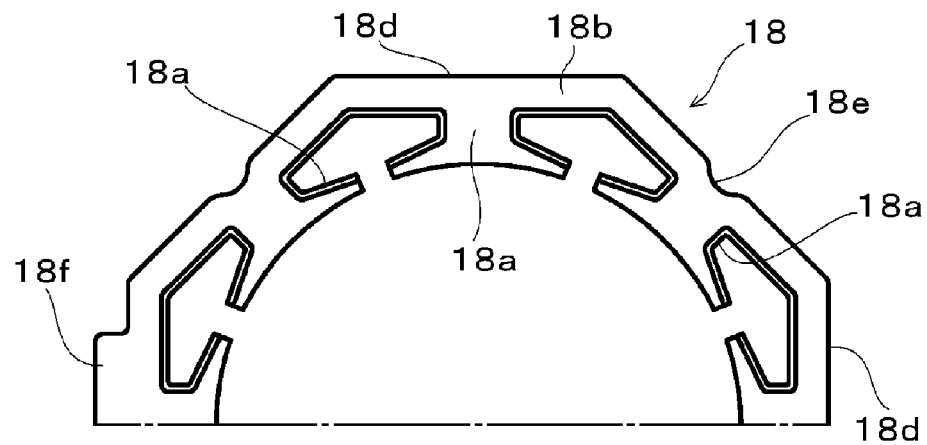
FIG. 7A is a top view showing a portion (one half) of a lower insulating member of the stepping motor shown in FIG. 1.
Figure 7B:
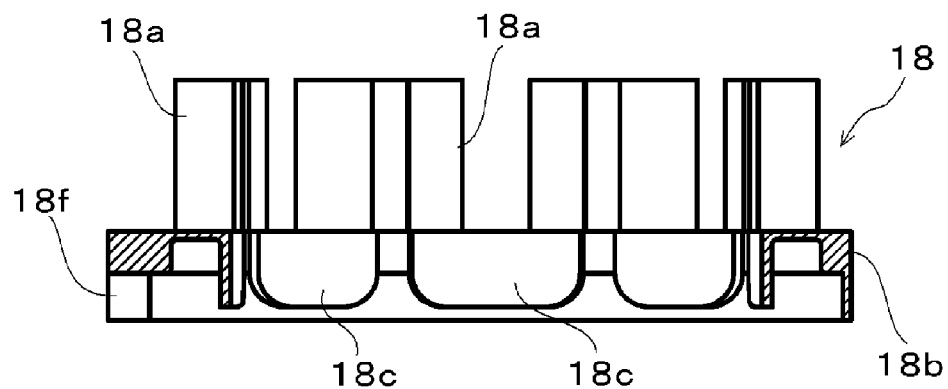
FIG. 7B is a sectional front view thereof.
Figure 7C:
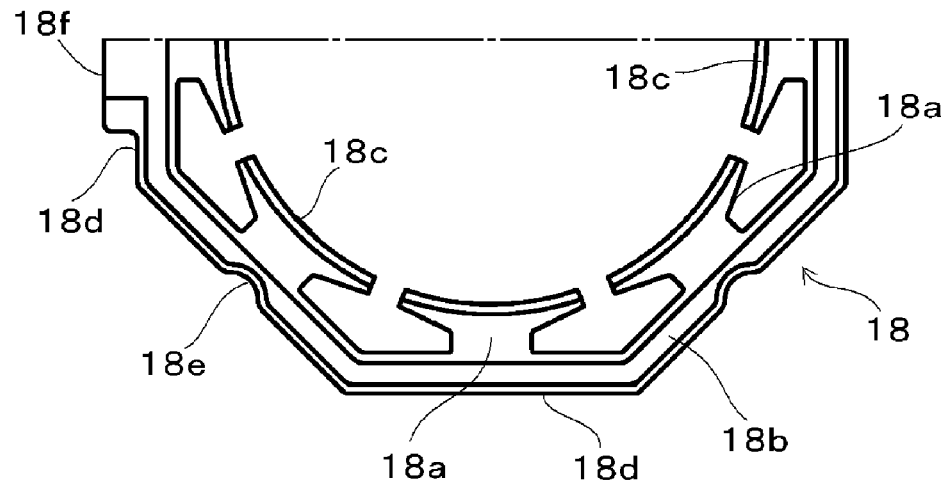
FIG. 7C is a bottom view thereof.

The lower insulating member 18 mounted to the stator core 12 at the lower side thereof is preferably configured as shown in FIGS. 7A to 7C. The lower insulating member 18 preferably includes slot insulating portions 18a that cover the lower surfaces and the side surfaces of the respective main poles 12b and a ring-shaped frame portion 18b interconnecting the lower sections of the respective slot insulating portions 18a. The radial outer periphery of each of the slot insulating portions 18a is arranged to extend along the inner peripheral surface of the core-back portion 12a. The adjoining slot insulating portions 18a are connected to each other. Thus, the slot insulating portions 18a are configured to cover the inner surfaces of the respective slots. In the inner peripheries of the lower surfaces of the slot insulating portions 18a, tongue pieces 18c are preferably arranged in a corresponding relationship with the tip end portions of the respective main poles 12b to protrude downward. The tongue pieces 18c prevent the coil 14 from jutting inward.

The frame portion 18b preferably has a regular octagonal contour or a substantially regular octagonal contour. The base section (upper half section) of the frame portion 18b interconnecting the respective slot insulating portions 18a is preferably thick. The tip end section (lower half section) of the frame portion 18b with which one of the below-mention cover members contacts is preferably thin. In the frame portion 18b preferably has a regular octagonal shape or a substantially regular octagonal shape, the outer peripheral surfaces of the portions corresponding to four sides of the stator core 12 are outer peripheral surface portions 18d flush or substantially flush with the outer peripheral surface of the core-back portion 12a. The outer peripheral surface portions 18d define a portion of the outer surface of the motor. The portions positioned between the respective outer peripheral surface portions 18d of the frame portion 18b are arranged along the inner sides of the receiving portions 12d of the stator core 12 and are preferably provided with recess portions 18e in alignment with the positions of the screw insertion holes 12e. A guide portion 18f including a drawing-out hole of a lead wire 19 preferably protrudes outward from one of the outer peripheral surface portions 18d of the frame portion 18b.

If the insulating members 16 and 18 are mounted to the stator core 12 at the upper and lower sides thereof, the tip ends of the slot insulating portions 16a and 18a face toward each other in the slots with a small gap interposed therebetween. Thus, the peripheral surfaces of the respective main poles 12b and the inner surface of the core-back portion 12a are covered with the insulating members 16 and 18. In this state, the coil 14 is wound around the respective main poles 12b.

The rotor 20 arranged inside the stator core 12 is preferably a hybrid type rotor which includes unit rotors each defined by interposing a permanent magnet between a pair of rotor magnetic poles. In the present preferred embodiment, the rotor preferably includes two unit rotors. That is to say, the rotor 20 preferably includes four rotor magnetic poles 24AX, 24BX, 24BY and 24AY axially arranged side by side and fixed to a rotor shaft 22, and two disc-shaped permanent magnets 26X and 26Y each magnetized in the axial direction and respectively interposed between the rotor magnetic poles 24AX and 24BX and between the rotor magnetic poles 24BY and 24AY. Each of the rotor magnetic poles is preferably defined by stacking silicon steel plates one above another. A plurality of (e.g., twenty two) magnetic teeth is arranged, at a regular pitch, on the outer circumference of each of the rotor magnetic poles.

The rotor magnetic poles 24AX and 24BX are arranged such that the teeth pitches thereof are shifted one half from each other. Similarly, the rotor magnetic poles 24AY and 24BY are arranged such that the teeth pitches thereof are shifted one half from each other. The permanent magnets 26X and 26Y are magnetized in the axial direction. The magnetizing directions of the permanent magnets 26X and 26Y are set to be opposite to each other so that the mutually-facing adjoining rotor magnetic poles 24BX and 24BY, among the rotor magnetic poles 24AX and 24BX magnetized by the permanent magnets 26X and the rotor magnetic poles 24AY and 24BY magnetized by the permanent magnets 26Y, have the same polarity. At this time, the teeth positions of the adjoining rotor magnetic poles 24BX and 24BY in the circumferential direction are identical with each other. A unit rotor 28X is defined by the rotor magnetic poles 24AX and 24BX and the permanent magnet 26X. A unit rotor 28Y is defined by the rotor magnetic poles 24AY and 24BY and the permanent magnet 26Y. FIG. 1 shows a state in which the unit rotors 28X and 28Y adjoin each other with no gap left therebetween. Alternatively, the unit rotors 28X and 28Y may adjoin each other in an axially slightly spaced-apart state.

The respective magnetic teeth of the rotor magnetic poles of the unit rotors 28X and 28Y are preferably radially opposed to the inductor teeth 12c of the respective main poles 12b of the stator 10 with an air gap left therebetween. The rotor shaft 22 of the rotor 20 supporting the unit rotors 28X and 28Y are subjected to knurling in the positions corresponding to the respective rotor magnetic poles. The rotor shaft 22 is preferably, for example, press-fitted to the rotor magnetic poles that grip the permanent magnets 26X and 26Y therebetween. The rotor magnetic poles are prevented from rotation by the knurled portions of the rotor shaft 22 and are firmly fixed to the knurled portions. The permanent magnets 26X and 26Y are preferably ferrite-based permanent magnets having a residual magnetic flux density of about 0.5T or less, for example. As described earlier, the inner diameter of the stator 10 is preferably set about 15% larger than that which is possible in the conventional case. In conformity therewith, the outer diameter of the rotor 20 is preferably set to be about 15% larger than that which is possible in the conventional case. For that reason, even if the permanent magnets 26X and 26Y are ferrite-based permanent magnets, the obtainable torque becomes significantly larger than that in the conventional case.

Referring to FIG. 1, an upper cover member 30 and a lower cover member 32 are preferably arranged at the axial opposite sides of the stator 10. The upper cover member 30, the lower cover member 32 and the outer peripheral surface of the stator 10 define the outer surface of the motor. The contours of the cover members 30 and 32 preferably have a square or substantially square shape just like the stator core 12.

Figure 8:
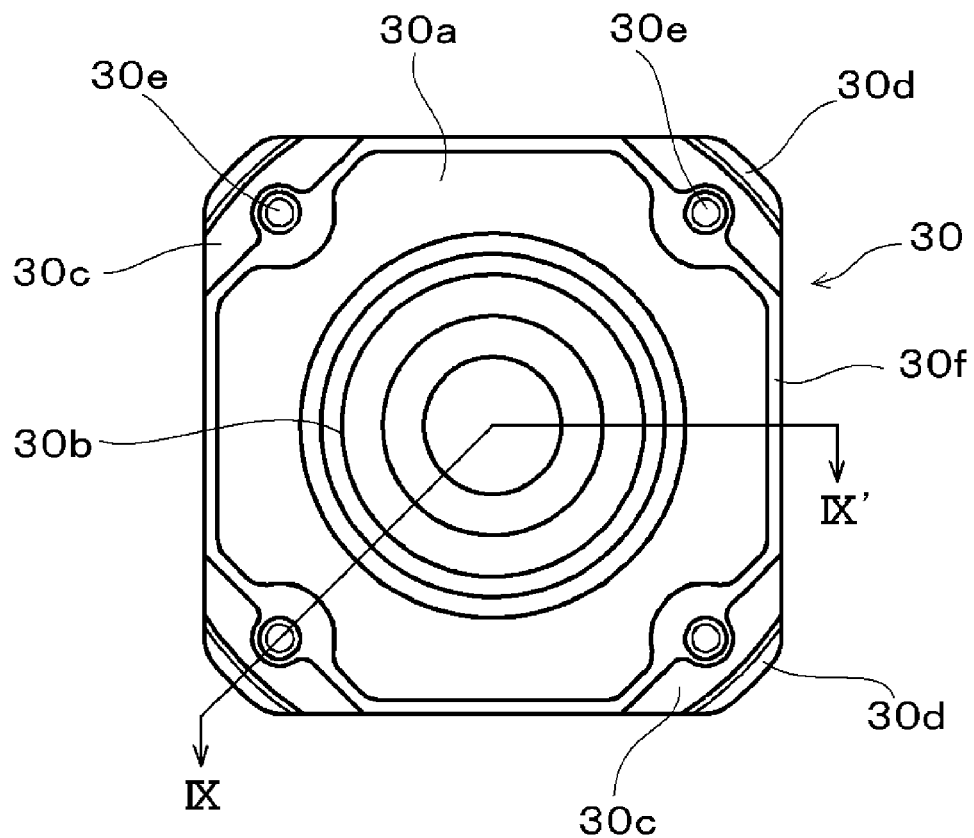
FIG. 8 is a bottom view showing an upper cover member of the stepping motor shown in FIG. 1.
Figure 9:
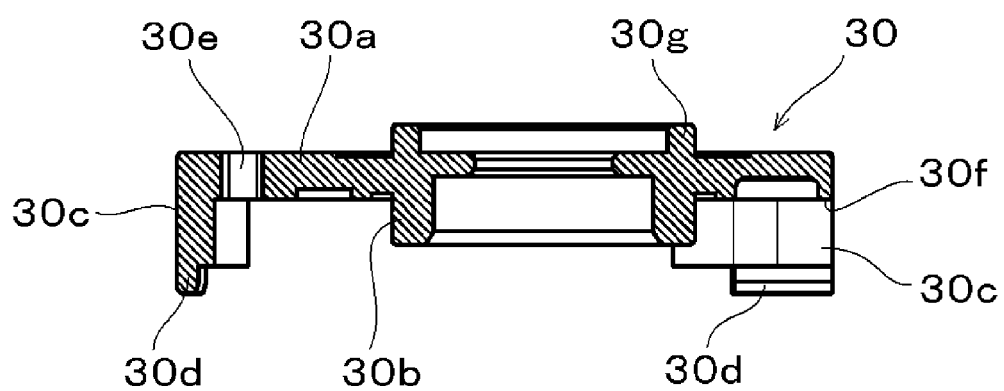
FIG. 9 is a sectional view taken along line IX-IX' in FIG. 8.

As shown in FIGS. 8 and 9, the upper cover member 30 preferably includes a square or substantially square end plate portion 30a defining the upper end surface of the motor, a cylindrical bearing holding portion 30b provided in the central region of the end plate portion 30a to protrude downward, and four leg portions 30c positioned in four corners of the end plate portion 30a and positioned to protrude downward. The upper cover member 30 can preferably be installed in the stator core 12 by bringing the lower end surfaces of the respective leg portions 30c into contact with the upper surfaces of the receiving portions 12d of the four corners of the stator core 12. Claws 30d protruding downward from the end surfaces of the leg portions 30c are preferably provided in the outermost edge sections, i.e., the radial outer sections, of the respective leg portions 30c. The upper cover member 30 is aligned with the stator core 12 by locking the claws 30d to the outer surfaces of the four corners of the stator core 12 and bringing the end surfaces of the leg portions 30c into contact with the receiving portions 12d. Screw holes 30e are preferably defined in the positions of the end plate portion 30a of the upper cover member 30 adjoining the respective leg portions 30c. The screw holes 30e preferably axially communicate with the respective screw insertion holes 12e of the stator core 12. As clearly shown in FIG. 8, a ring-shaped contact surface 30f is continuously provided along the side edges between the respective leg portions 30c and along the inner edges of the respective leg portions 30c. The upper end surface of the frame portion 16b of the upper insulating member 16 contacts the contact surface 30f over its entire circumference.

Figure 10:
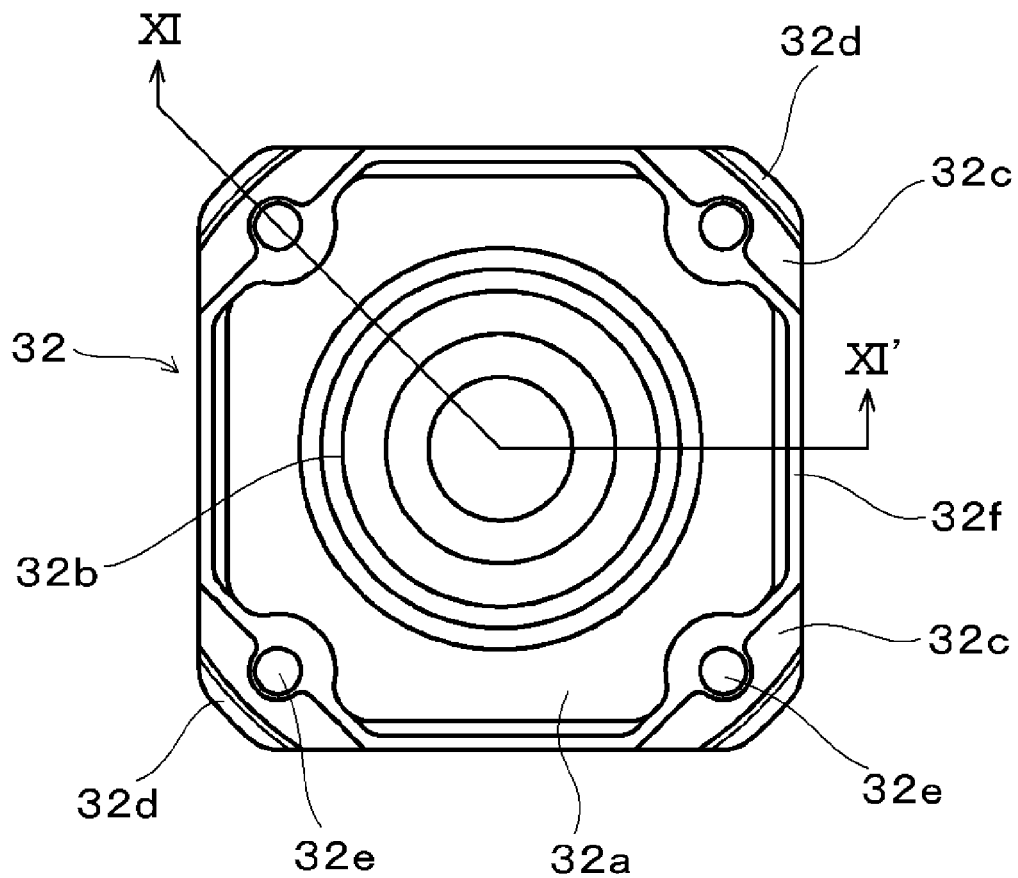
FIG. 10 is a top view showing a lower cover member of the stepping motor shown in FIG. 1.
Figure 11:
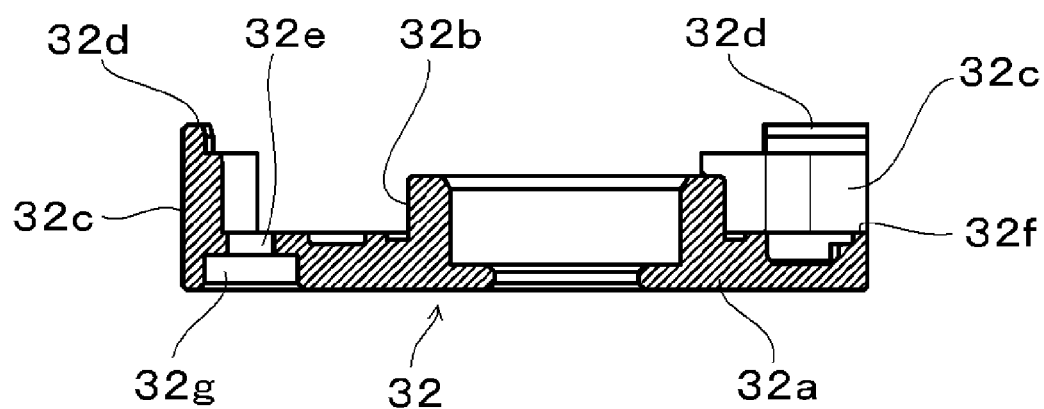
FIG. 11 is a sectional view taken along line XI-XI' in FIG. 10.

As shown in FIGS. 10 and 11, the lower cover member 32 preferably includes a square or substantially square end plate portion 32a defining the lower end surface of the motor, a cylindrical bearing holding portion 32b positioned in the central region of the end plate portion 32a to protrude upward, and four leg portions 32c positioned in four corners of the end plate portion 32a and positioned to protrude upward. The lower cover member 32 is preferably installed in the stator core 12 by bringing the upper end surfaces of the respective leg portions 32c into contact with the lower surfaces of the receiving portions 12d of the four corners of the stator core 12. Claws 32d protruding upward from the end surfaces of the leg portions 32c are preferably provided in the outermost edge sections, i.e., the radial outer sections, of the respective leg portions 32c. The lower cover member 32 is aligned with the stator core 12 by locking the claws 32d to the outer surfaces of the four corners of the stator core 12 and bringing the end surfaces of the leg portions 32c into contact with the receiving portions 12d. Screw holes 32e are preferably positioned in the positions of the end plate portion 32a of the lower cover member 32 adjoining the respective leg portions 32c. The screw holes 32e axially communicate with the respective screw insertion holes 12e of the stator core 12. As clearly shown in FIG. 10, a ring-shaped contact surface 32f is preferably continuously defined along the side edges between the respective leg portions 32c and along the inner edges of the respective leg portions 32c. The lower end surface of the frame portion 18b of the lower insulating member 18 preferably contacts the contact surface 32f over the whole circumference.

As shown in FIG. 1, bearings 34 and 36, which are preferably, for example, ball bearings, are held in the bearing holding portions 30b and 32b of the upper cover member 30 and the lower cover member 32. The rotor shaft 22 of the rotor 20 is rotatably supported by the bearings 34 and 36. The cover members 30 and 32 are mounted to the opposite sides of the stator core 12. The tip end portions of screws (not shown) inserted into the screw insertion holes 32e of the lower cover member 32 are preferably passed through the screw insertion holes 12e of the stator core 12 and are coupled to threads of the screw holes 30e of the upper cover member 30, such that the stator core 12 and the cover members 30 and 32 are fastened and unified. A leaf spring 38 making resilient contact with the outer race of the bearing 36 is preferably installed within the bearing holding portion 32b of the lower cover member 32. The end surface of the outer race of the bearing 34 of the upper cover member 30 is pressed by the upper cover member 30. The inner races of the upper and lower bearings 34 and 36 are unified through the rotor 20, a spacer and the like. Therefore, if the stator core 12 and the cover members 30 and 32 are fastened together by screws, for example, a constant pre-compression pressure is applied to the bearings 34 and 36 by the leaf spring 38. This makes it possible to obtain a stable rotation support state without or substantially without generating any backlash.

The lower portions of the screw insertion holes 32e of the end plate portion 32a of the lower cover member 32 are increased in diameter to define recess portions 32g. The heads of screws are received in the recess portions 32g and are prevented from protruding outward of the motor. A spigot joint tube portion 30g provided in a concentric relationship with the bearing holding portion 30b protrudes upward from the central upper surface of the end plate portion 30a of the upper cover member 30. By using the spigot joint tube portion 30g, it is possible to accurately bring the rotor shaft 22 into alignment with an input unit of various kinds of devices when the motor 1 is attached to various kinds of devices.

The stepping motor configured as above can preferably be assembled in the following manner, for example.

First, the insulating members 16 and 18 are mounted to the stator core 12 at the axial opposite sides thereof. In this state, the coil 14 is wound around the respective main poles 12b through the slot insulating portions 16a and 18a. The end of the two-phase coil 14 is connected to, e.g., a relay circuit board held in the lower insulating member 18. A lead wire 19 to be drawn outward is preferably electrically connected to the coil end through the relay circuit board. The lead wire 19 is drawn out through the guide portion 18f of the lower insulating member 18. In this way, the stator 10 is provided. At this time, the outer peripheral surface portions 16d and 18d of four sides of the frame portions 16b and 18b of the insulating members 16 and 18 are flush or substantially flush with the outer surface of the stator core 12. As described above, the hybrid type rotor 20 is preferably defined by four rotor magnetic poles 24AX, 24BX, 24BY and 24AY axially arranged side by side and fixed to the rotor shaft 22, and two disc-shaped permanent magnets 26X and 26Y respectively interposed between the rotor magnetic poles 24AX and 24BX and between the rotor magnetic poles 24BY and 24AY.

Next, the lower cover member 32 is attached to the stator core 12. At this time, the claws 32d of the respective leg portions 32c of the lower cover member 32 guide the outer surfaces of four corner portions of the stator core 12. Thus, the lower cover member 32 and the stator core 12 are preferably aligned with each other. This makes it possible to assemble the lower cover member 32 and the stator 10 in a centered state. The stator core 12 is supported by bringing the receiving portions 12d of four corners of the stator core 12 into contact with the upper end surfaces of the respective leg portions 32c of the lower cover member 32. The outer peripheral surface portions 18d of the frame portion 18b of the lower insulating member 18 are arranged between the respective leg portions 32c adjoining each other and are exposed to the outside.

Thereafter, the leaf spring 38 and the bearing 36 are preferably installed within the bearing holding portion 32b of the lower cover member 32. In this state, the rotor 20 is inserted into the stator 10 from the upper opening of the stator 10. The lower end portion of the rotor shaft 22 is inserted into the inner race of the bearing 36. Subsequently, the upper cover member 30 is attached to the stator 10 with the bearing 34 held in the bearing holding portion 30b. At this time, the upper end portion of the rotor shaft 22 is preferably inserted into the inner race of the bearing 34. The claws 30d of the respective leg portions 30c of the upper cover member 30 are guided by the outer surfaces of four corners of the stator core 12, such that the rotor 20 is centered with respect to the stator 10. Then, if the lower end surfaces of the respective leg portions 30c of the upper cover member 30 are brought into contact with the upper surfaces of the receiving portions 12d of four corners of the stator core 12, the outer peripheral surface portions 16d of the frame portion 16b of the upper insulating member 16 are arranged between the respective leg portions 30c adjoining each other and are exposed to the outside. In four corners, the fixing screws are inserted through the screw insertion holes 32e of the lower cover member 32 and the screw insertion holes 12e of the stator core 12 and are coupled to threads of the screw holes 30e of the upper cover member 30, thus fastening the stator 10 and the cover members 30 and 32 together.

In the stepping motor configured as above, the frame portions 16b and 18b of the upper and lower insulating members 16 and 18 used in insulating the coil 14 with respect to the stator core 12 are not accommodated within the upper and lower cover members 30 and 32. The frame portions 16b and 18b are partially exposed at the surface of the motor as the outer peripheral surface portions 16d and 18d. This preferably makes it possible to increase the inner diameter of the stator core 12 to the utmost limit, and in proportion thereto, it becomes possible to increase the diameter of the rotor 20 and to significantly increase the output of the motor. For that reason, even if low-grade ferrite-based permanent magnets are used as the permanent magnets 26X and 26Y in the unit rotors 28X and 28Y defined by the rotor 20, it is possible to increase the output of the motor as compared with the conventional motor and to provide the motor in a cost-effective manner.

In order to partially expose the upper and lower insulating members 16 and 18 to the outside, the upper and lower cover members 30 and 32 are configured into a simple shape by positioning the leg portions 30c and 32c at four corners of the square end plate portion 30a and 32a. Thus, the upper and lower cover members 30 and 32 are preferably provided in a 90° rotation symmetry shape. There is no restriction in the direction in which the cover members 30 and 32 are attached to the stator 10. The cover members 30 and 32 can be attached to the stator 10 in any direction. This provides an advantage in that the ease of assembly is greatly improved. In particular, the lead wire 19 is drawn outward by providing the guide portion 18f in the outer peripheral surface portion 18d of the frame portion 18b of the lower insulating member 18, namely in the outwardly-exposed portion of the frame portion 18b. Therefore, unlike the conventional motor, there is no need to perform wire-drawing-out processing on the cover member. Moreover, it becomes easy to produce the lower cover member 32.

Since the stator core 12 and the cover members 30 and 32 preferably have a square shape or a substantially square shape, the area of four corners becomes larger. The respective leg portions 30c and 32c contact the stator core 12 in the four corners. Thus, the respective members are fastened together with increased strength in the four equally-spaced corners. This eliminates the possibility that uneven forces act on the stator core 12 and the cover members 30 and 32. Thus, deformation is not generated in the respective members.

In case of an inner-rotor-type motor of Japanese Patent Application Publication No. 2002-051528 and Japanese Patent Application Publication No. 2001-112521 in which the axial opposite sides of the stator are covered with the upper and lower cover members over the whole periphery, the dust-proofness of the interior of the motor is secured by the cover members. In contrast, in case of the motor of the present preferred embodiment in which only the leg portions 30c and 32c of the cover members 30 and 32 are brought into contact with the stator core 12, the spaces between the stator core 12 and the cover members 30 and 32 are opened in between the leg portions 30c and 32c. However, the outer peripheral surface portions 16d and 18d of the frame portions 16b and 18b of the insulating members 16 and 18 are positioned in the opened spaces. Moreover, the end surfaces of the frame portions 16b and 18b make contact with the ring-shaped contact surfaces 30f and 32f of the end plate portions 30a and 32a of the cover members 30 and 32 over the whole periphery. Therefore, the inner sides of the frame portions 16b and 18b are isolated from the outside. This makes it possible to secure dust-proofness. In particular, the base-side half sections of the frame portions 16b and 18b are preferably thick, to have strength, while the tip-end-side half sections thereof are preferably thin, to have flexibility. Therefore, when the cover members 30 and 32 are fastened to the stator 10, the tip end sections of the frame portions 16b and 18b are pressed against the cover members 30 and 32. It is therefore possible to bring the tip end sections of the frame portions 16b and 18b and the cover members 30 and 32 into close contact with each other, thus increasing the dustproof effect.

Second Preferred Embodiment

Figure 12:
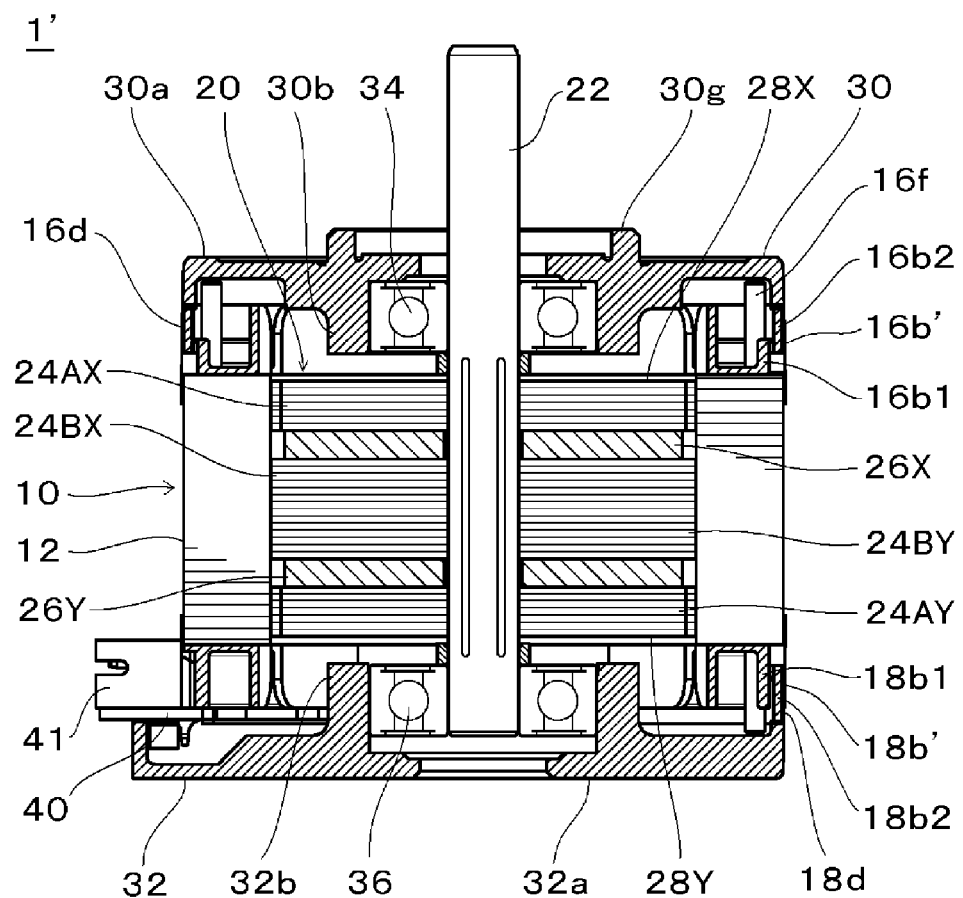
FIG. 12 is a sectional front view showing an inner-rotor-type stepping motor according to another preferred embodiment of the present invention.
Figure 13:
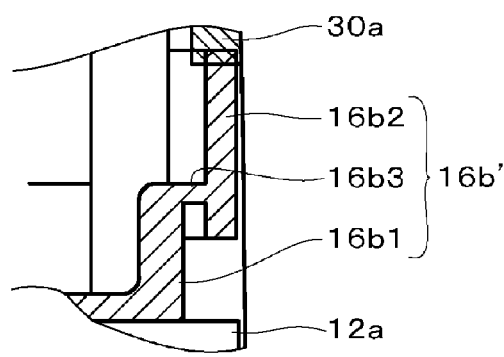
FIG. 13 is a partially enlarged view showing a frame portion of an upper insulating member of the stepping motor shown in FIG. 12.

Next, another preferred embodiment of the present invention will be described with reference to FIGS. 12 and 13. FIG. 12 is a sectional front view showing the overall configuration of a two-phase hybrid (HB) type stepping motor 1' according to another preferred embodiment of the present invention. FIG. 13 is a partially enlarged view of the stepping motor shown in FIG. 12. In FIGS. 12 and 13, identical or equivalent elements or portions are designated by the same reference symbols as those used in FIGS. 1 to 11.

The stepping motor 1' shown in FIG. 12 differs from the stepping motor of the foregoing preferred embodiment in terms of the frame portions 16b' and 18b' of the insulating members 16 and 18 of the stator 10. More specifically, each of the upper and lower insulating members 16 and 18 defining and serving as insulators preferably includes slot insulating portions 16a or 18a which cover the end surfaces and the opposite side surfaces of the main poles 12a of the stator core 12, and a ring-shaped frame portion 16b' or 18b' which interconnects the slot insulating portions 16a or 18a at the upper or lower side thereof. The contour of the frame portion 16b' or 18b' preferably has a regular octagonal shape or a substantially regular octagonal shape, for example. As shown in FIG. 13, the frame portion 16b' of the upper insulating member 16 preferably includes a base-side ring-shaped frame 16b1 having a diameter slightly smaller than the outer diameter of the stator core 12 and provided in a regular octagonal shape or a substantially regular octagonal shape, a tip-end-side ring-shaped frame 16b2 having a diameter equal or substantially equal to the outer diameter of the stator core 12 and preferably having a regular octagonal shape or a substantially regular octagonal shape, and a ring-shaped thin portion 16b3 which interconnects the end portion of the base-side ring-shaped frame 16b1 and the lower portion of the tip-end-side ring-shaped frame 16b2. The outer peripheral surfaces of the portions of the tip-end-side ring-shaped frame 16b2 corresponding to four sides of the stator core 12 are outer peripheral surface portions 16d flush or substantially flush with the outer peripheral surface of the core-back portion 12a.

Similarly, the frame portion 18b' of the lower insulating member 18 preferably includes a base-side ring-shaped frame 18b1 having a diameter a little smaller than the outer diameter of the stator core 12 and preferably having a regular octagonal shape or a substantially regular octagonal shape, a tip-end-side ring-shaped frame 18b2 having a diameter equal or substantially equal to the outer diameter of the stator core 12 and preferably having a regular octagonal shape or a substantially regular octagonal shape, and a ring-shaped thin portion which interconnects the base-side ring-shaped frame 18b1 and the tip-end-side ring-shaped frame 18b2. The outer peripheral surfaces of the portions of the tip-end-side ring-shaped frame 18b2 corresponding to four sides of the stator core 12 are preferably outer peripheral surface portions 18d flush or substantially flush with the outer peripheral surface of the core-back portion 12a.

In the frame portions 16b' and 18b', the thickness of the base-side ring-shaped frames 16b1 and 18b1 is preferably set relatively large to increase the strength whereas the thickness of the tip-end-side ring-shaped frames 16b2 and 18b2 is preferably set relatively small. The thickness of the ring-shaped thin portions is set such that the ring-shaped thin portions can be easily bent by the pressure applied to the tip-end-side ring-shaped frames. The tip-end-side ring-shaped frames are elastically deformable in the axial direction with respect to the base-side ring-shaped frames. As a result, if the upper cover member 30 and the lower cover member 32 are attached to the axial opposite sides of the stator 10, the end edges of the tip-end-side ring-shaped frame 16b2 and 18b2 of the frame portions 16b' and 18b' make elastic contact with the ring-shaped contact surfaces of the end plate portions 30a and 32a of the cover members 30 and 32. Thus, the interior of the frame portions 16b' and 18b' is hermetically sealed and a dust-free interior is reliably secured.

The stepping motor 1' shown in FIG. 12 further differs from the stepping motor of the foregoing preferred embodiment in terms of a coil drawing-out configuration. More specifically, in case of the preferred embodiment shown in FIG. 1, the lead wire connected to the coil end through the use of the relay circuit board within the motor is preferably drawn out from the guide portion of the lower insulating member. In FIG. 12, a circuit board 40 is arranged between the frame portion 18b' of the lower insulating member 18 and the lower cover member 32. The coil end is connected to the circuit board 40. A connector 41 is preferably mounted to a projection of the circuit board 40 protruding from the frame portion 18b'. By connecting a connector of an external lead wire to the connector 41, it becomes possible to connect the external lead wire to the coil via the connector 41 and the circuit board 40.

The circuit board 40 is attached to the frame portion 18b' of the lower insulating member 18. In particular, if the protruding height of the base-side ring-shaped frame 18b1 of the frame portion 18b' is appropriately set and if the circuit board 40 is brought into contact with the end surface of the base-side ring-shaped frame 18b1, it becomes possible to position the circuit board 40 at a predetermined height within the frame portion 18b'.

While preferred embodiments of the present invention have been described above, the present invention is not limited to the aforementioned preferred embodiments but may be differently modified within the scope of the claims.

For example, in the aforementioned preferred embodiments, description has been made of the two-phase stepping motor. However, the present invention is not limited to the stepping motor but may be applied to any other type of inner-rotor motors. The present inner-rotor-type motor may be a three-phase motor, for example. The rotor of the motor is not limited to a hybrid type rotor but may be a permanent magnet type rotor in which different magnetic poles are alternately arranged along the circumferential direction. The insulating members 16 and 18 used in the stator 10 need not necessarily have a regular octagonal shape or a substantially regular octagonal shape but may have an octagonal shape showing 90° rotation symmetry. The bearings 34 and 36 rotatably supporting the rotor 20 are not limited to ball bearings but may be plain bearings or any other desirable type of bearings.

The inner-rotor-type motor according to preferred embodiments of the present invention generates high torque while also being cost effective. The inner-rotor-type motor according to preferred embodiments of the present invention is usable as a stepping motor in OA machines such as, for example, a copier or a printer and can provide a rotary electric machine which is relatively cheap, high in speed and torque, and low in vibration. Thus, the inner-rotor-type motor according to preferred embodiments of the present invention is expected to make great contribution in the industrial field. In addition, it is highly expected that the inner-rotor-type motor according to preferred embodiments of the present invention can find its application in, for example, medical devices, FA devices, robots, amusement machines and housing equipment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An inner-rotor-type motor, comprising:
a stator including a stator core and a coil, the stator core including a ring-shaped core-back portion and a plurality of main poles protruding radially inward from the core-back portion, the coil being wound around each of the plurality of main poles through an insulator;
a rotor rotatably arranged inside the stator to face tip ends of the plurality of main poles and provided with a rotor shaft extending along a center axis; and
cover members arranged to cover axial opposite sides of the stator and configured to hold bearings which support the rotor shaft; wherein
the core-back portion of the stator core has a square or substantially square shape;
the core-back portion includes side surfaces corresponding to four sides of a square;
the side surfaces of the core-back portion are configured to define motor outer surfaces;
the insulator includes two insulating members mounted to the stator core at the axial opposite sides thereof;
each of the two insulating members includes a plurality of slot insulating portions which covers the main poles and an octagonal or substantially octagonal frame portion which interconnects the plurality of slot insulating portions at an axial end surface side of the stator core;
each of the frame portions includes four outer surface portions flush or substantially flush with the motor outer surfaces of four sides of the core-back portion;
each of the cover members includes an end plate portion configured to define an end surface of the motor and provided with a bearing holding portion in a central region thereof, and four leg portions arranged in four corners of the end plate portion and configured to contact axial end surfaces of four corner portions of the stator core;
each of the outer surface portions of the frame portion of each of the insulating members is inserted between the leg portions of each of the cover members; and
each of the frame portions includes a base-side ring-shaped frame having a diameter slightly smaller than an outer diameter of the stator core, a tip-end-side ring-shaped frame having a diameter equal or substantially equal to the outer diameter of the stator core, and a ring-shaped thin portion which interconnects the base-side ring-shaped frame and the tip-end-side ring-shaped frame.

2. The motor of claim 1, wherein a radial minimum thickness of the four sides of the core-back portion is a minimum value within a range permitted as a magnetic path in terms of a magnetic property, and a protruding length of each of the main poles is a minimum value which allows the coil to be wound around each of the main poles at a predetermined winding number.

3. The motor of claim 2, wherein a ratio of an inner diameter of the stator core to a minimum outer diameter of the stator core is about 0.7.

4. The motor of claim 1, wherein a tip end of the frame portion of each of the insulating members is configured to contact the end plate portion at least in the four outer surface portions.

5. The motor of claim 4, wherein the tip-end-side ring-shaped frame corresponds to the four outer surface portions being flush or substantially flush with the motor outer surface of the core-back portion.

6. The motor of claim 1, wherein claws locked to the outer surfaces of the four corner portions of the stator core at the outer side thereof are provided as a single monolithic member together with the leg portions of each of the cover members.

7. The motor of claim 1, wherein fixing holes are provided in the four corner portions of the stator core and in the leg portions of each of the cover members, and each of the cover members is fastened to the stator core by screws inserted through the fixing holes of the stator core.

8. The motor of claim 1, wherein each of the cover members has a 90° rotation symmetry shape.

9. The motor of claim 1, wherein sections of the frame portion of each of the insulating members interposed between the four outer surface portions are arranged along inner sides of the leg portions of each of the cover members.

10. The motor of claim 1, wherein a drawing-out hole of a lead wire connected to the coil or a connector mounting portion is provided on an outer surface portion of one of the insulating members.

\* \* \* \* \*